(12) United States Patent
Garza

(10) Patent No.: US 10,639,739 B2
(45) Date of Patent: May 5, 2020

(54) SENSORLESS PRESSURE CHANGE DETECTION FOR SERVO GUN

(71) Applicant: Fanuc America Corporation, Rochester Hills, MI (US)

(72) Inventor: Frank Garza, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 322 days.

(21) Appl. No.: 15/223,122

(22) Filed: Jul. 29, 2016

(65) Prior Publication Data

US 2018/0029155 A1  Feb. 1, 2018

(51) Int. Cl.
| | |
|---|---|
| *B23K 11/25* | (2006.01) |
| *B23K 31/12* | (2006.01) |
| *B23K 11/11* | (2006.01) |
| *G01L 25/00* | (2006.01) |
| *G01L 5/00* | (2006.01) |

(52) U.S. Cl.
CPC ........... *B23K 11/255* (2013.01); *B23K 11/11* (2013.01); *B23K 11/115* (2013.01); *B23K 31/125* (2013.01); *G01L 5/0066* (2013.01); *G01L 5/0076* (2013.01); *G01L 25/003* (2013.01)

(58) Field of Classification Search
None
See application file for complete search history.

(56) References Cited

U.S. PATENT DOCUMENTS

| | | | | | |
|---|---|---|---|---|---|
| 5,582,747 | A | * | 12/1996 | Sakai | B23K 11/115 219/109 |
| 5,898,285 | A | * | 4/1999 | Nagasawa | B23K 11/315 318/568.13 |
| 6,313,427 | B1 | * | 11/2001 | Suita | B23K 11/10 219/109 |
| 6,531,674 | B2 | | 3/2003 | Suita | |
| 7,974,733 | B2 | * | 7/2011 | Gupta | B23K 11/314 219/125.1 |
| 9,144,860 | B2 | | 9/2015 | Garza et al. | |
| 2011/0089146 | A1 | | 4/2011 | Takahashi et al. | |
| 2013/0256278 | A1 | * | 10/2013 | Garza | B23K 11/115 219/86.41 |
| 2014/0291300 | A1 | * | 10/2014 | Amagata | B23K 11/115 219/90 |

FOREIGN PATENT DOCUMENTS

JP  H1094882 A  4/1998

* cited by examiner

*Primary Examiner* — Nathaniel T Woodward
(74) *Attorney, Agent, or Firm* — John A. Miller; Shumaker, Loop & Kendrick, LLP

(57) ABSTRACT

A method and an apparatus detects pressure changes at servo gun tips of a robotic welding system having a servo gun with a movable tip and an opposed fixed tip configured to weld a part. The method and apparatus observe a tip deflection value and convert the value to a current pressure value using a pressure estimator. The current pressure value is compared to a benchmark pressure value to detect any difference.

20 Claims, 4 Drawing Sheets

| Alert# | Condition | Causes and/or recommendation(s) |
|---|---|---|
| 1 | Spring error | Spring and/or relation of pressure to deflection has changed. Gun arm may be fracturing or motor torque output has changed. |
| 2 | F1 pressure or spring error | ABS( dF - dX ) > 10%<br>Pressure Value has changed, but deflection is the same OR pressure value is same, but deflection has changed.<br>Get gauge and check pressure. If pressure is ok, then confirm that gun is not fracturing. If deflection has changed significantly, then it may be wise to retune. |
| 3 | F2 pressure or Spring error | ABS( dF - dX ) > 10%<br>Pressure Value has changed, but deflection is the same OR pressure value is same, but deflection has changed.<br>Get gauge and check pressure. If pressure is ok, then confirm that gun is not fracturing. If deflection has changed significantly, then it may be wise to retune. |
| 4 | Efficiency error | Efficiency value is outside of normal range ( <65% or > 135% ). Confirm that configuration settings match actual hardware. |
| 5 | FcalThresh state | Close thresh has changed by more than 30% and gun clos misdetection is possible. Confirm that gun is mechanically ok. Retune gun if it is ok or not. |

FIG. 3

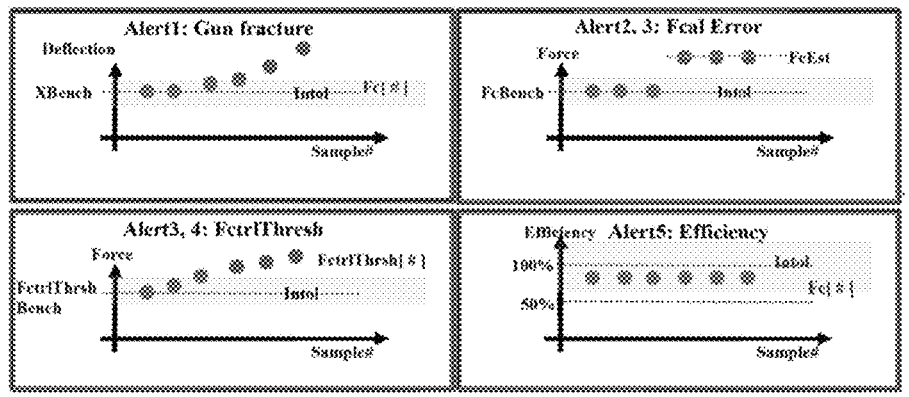

FIG. 4

SENSORLESS PRESSURE CHANGE DETECTION FOR SERVO GUN

FIELD OF THE INVENTION

This invention relates to a robotic welding gun and a method and an apparatus for detecting gun tip pressure changes.

BACKGROUND OF THE INVENTION

This section provides background information related to the present disclosure which is not necessarily prior art.

Welding robot systems having spot welding guns are described, for example, in U.S. Pat. Appl. Pub. No. 2011/0089146 A1 to Takahashi et al. and U.S. Pat. No. 5,898,285 to Nagasawa et al. A typical spot welding servo gun includes a main body having a stationary electrode tip and a movable electrode tip. The stationary electrode tip is disposed opposite the movable electrode tip. The stationary electrode tip is generally immovable relative to the main body of the spot welding gun, and the movable electrode tip is mounted on the main body and opened and closed during a welding operation.

U.S. Pat. No. 9,144,860 B2 to Garza et al. describes a method for controlling a welding robot having a servo gun with a movable tip and a fixed tip including the steps of separately contacting a surface of a part with the movable tip to measure a base test point and an at least two additional test points displaced from the base test point. Two non-collinear vectors are calculated from the at least two additional test points. A normal vector is calculated from the two non-collinear vectors. An angle between the original servo gun orientation and the normal vector is determined. An orientation of the servo gun may be corrected, for example, if the angle is within user specified tolerances.

Another issue related to controlling a servo gun is the pressing force. Japanese Patent Publication No. 10-94882 discloses a method for controlling a pressing force of a welding gun. In the method, a small quantity of an elastic displacement, generated in a fixed side electrode tip when a moving side electrode tip is driven to contact the fixed side electrode tip and further driven to press the fixed side electrode tip, is detected by an encoder of a servo motor for driving the moving side electrode tip. More particularly, the elastic displacement is determined based on the rotation increment of the servo motor generated from the time when the moving side electrode tip begins to contact the fixed side electrode tip to when the electric current suddenly increases when the moving side electrode tip is further driven to press the fixed side electrode tip. A real pressing force between the electrode tips is calculated based on the measured elastic displacement of the fixed side electrode tip. Then, a setting pressing force between the electrode tips is modified to be equal to the calculated real pressing force.

However, there are the following problems with the above-described conventional method for controlling a welding gun.

First, since a moving side portion of the welding gun including the moving side electrode tip and the servo motor for driving the moving side electrode tip is provided with a speed reducer, a mechanical impedance of the moving side portion is greater and dynamically harder than that of a fixed side portion of the welding gun. In this instance, the mechanical impedance is defined as an impedance expressed by a vector of |m, c, k|, when a movement of the electrode tip is expressed by an equation:

$$m \cdot d^2x/dt^2 + c \cdot dx/dt + kx = F(t).$$

In a case where the vector only includes k, the mechanical impedance is a spring constant. The encoder is located on the opposite side of the moving side electrode tip with respect to the speed reducer of the servo motor, so that a pressing quantity of the moving side electrode tip, transmission of a change in the pressing displacement and the pressing force to the encoder through the speed reducer is a small amount and is delayed. As a result, the responsibility is lowered, so that it is difficult to obtain an accurate response with the conventional method, in which the welding gun is controlled based on an output of the encoder.

Second, since the rigidity of an arm supporting the fixed side electrode tip is increased so that the mechanical impedance of the fixed side portion including the fixed side electrode tip and the arm is nearly equal to the mechanical impedance of the moving side portion, the size and the weight of the arm is large, which causes the welding gun to be increased both in size and weight.

U.S. Pat. No. 6,531,674 B2 to Suita describes an intelligent welding gun provided with a fixed side sensor in a fixed side portion. The mechanical impedance of the fixed side portion is kept small, which permits the mechanical impedance to be set in a range where the fixed side sensor can effectively detect at least one of a position of a fixed side welding tip and a pressing force imposed on the fixed side welding tip. The fixed side sensor and a moving side sensor constitute a redundant sensor measurement system. Various kinds of methods conducted using the above welding gun include a method of calibrating a sensor (including calibration of a reference point and a gain), a control method of suppressing a welding expulsion, a re-welding feedback control method, a control method of a welding strength, a control method of reducing a clearance between workpieces, a method of correcting a welding robot track, and a method of managing a positional accuracy change at a welding point.

However, the welding gun with sensors described in U.S. Pat. No. 6,531,674 B2 also has shortcomings. This welding gun is designed for adaptation; not for defect detection. Also, this welding gun requires sensors.

BRIEF SUMMARY OF THE INVENTION

The invention is based upon the observation that welding gun arm deflection is repeatable and proportional to gun tip pressure. A change in the calibrated pressure (FcDif %) can reveal a potential pressure calibration issue. For example, if the pressure gauge was inaccurate and/or the measurement was performed differently at pressure calibration. A deflection change Kdif % can indicate:
  that pressure calibration is needed (due to change in motor output or loss in actuator).
  gun arm fracture and/or motor deterioration.
A pressure calibration error can show up in welding efficiency, but the efficiency can also show that the hardware is wrong. For example, the efficiency will be <50% if 80 A amp is specified, but 40 A amp is installed.

The invention involves a method for detecting pressure changes at servo gun tips of a robotic welding system having a servo gun with a movable tip and an opposed fixed tip configured to weld a part. The method includes the steps of: storing benchmark values for a spring constant, a pressure estimator, an efficiency and an inertia/friction during noload operation; operating the servo gun to apply a first calibrated force at the gun tips and measure a resulting first deflection value at the gun tips; operating the servo gun to apply a second calibrated force at the gun tips and measure a resulting second deflection value at the gun tips; using the measured first and second deflection values and the pressure estimator to calculate current values for the spring constant, a first gun tip pressure, a second gun tip pressure, the efficiency and the inertia/friction during noload operation; comparing each of the current values with a corresponding one of the benchmark values; and generating an error indication for any of the current values that differs from the corresponding benchmark value by a predetermined amount.

The method includes selecting a standard force value; calculating a motor torque command based upon the standard force value and a motor torque constant for a motor to actuate the servo gun with a corresponding calibrated torque value; determining a calculated force value from the calibrated torque value and a pressure calibration table.

The method further includes forming the pressure estimator by plotting two points of calibrated pressure values and corresponding measured deflection values of the gun tips, drawing a line between the points, and converting the line to an equation for determining a new calibrated force value from a new measured deflection value.

If the spring constant current value is different from the spring constant benchmark value the method generates an error indication.

If the first pressure current value is different from the first pressure benchmark value the method generates an error indication. The method can include only generating the error indication if the difference is greater than ten percent.

If the second pressure current value is different from the second pressure benchmark value the method generates an error indication. The method can include only generating the error indication if the difference is greater than ten percent.

If the efficiency current value is different from the efficiency benchmark value the method generates an error indication. The method can include only generating the error indication if the difference is less than or greater than a predetermined range of a ratio of the efficiency current value to the efficiency benchmark value. The range can be 65% to 135%.

The method can include only generating the error indication if the Inertia/friction current value is different from the inertia/friction benchmark value. The method can include only generating the error indication if the difference is greater than thirty percent.

The method includes performing tip wear measurements on the gun tips and only performing the above steps if the tip wear measurements meet predetermined wear schedule conditions.

The method includes generating the error indication from a computer controlling the servo gun in response to any of the current values differing from a corresponding one of the benchmark values.

The invention further involves an apparatus for detecting pressure changes in a robotic welding system comprising: a servo gun with a movable tip opposed by a fixed tip; a motor coupled to the movable tip for moving the movable tip toward and away from the fixed tip; a computer connected to the motor for actuating the motor to move the movable tip; and a pressure test computer program executed by the computer. Execution of the program causes: the motor to move the movable tip to apply a first pressure at the fixed tip; the motor then move the movable tip to apply a second pressure at the fixed tip; the computer to store tip deflection values for the first and second pressures; the computer to calculate and store values for a spring constant, a pressure force estimator, efficiency and inertia/friction during noload operation from the stored deflection values; and if the pressure test is a first pressure test, designate the stored values as benchmark values. If the pressure test is not the first pressure test, the stored values are designated as current values.

The computer executes the pressure test computer program to generate an error indication in response to any of the current values differing from a corresponding one of the benchmark values.

The method for detecting pressure changes at servo gun tips of a robotic welding system having a servo gun with a movable tip and an opposed fixed tip configured to weld a part comprises the steps of: closing the movable tip against the fixed tip to apply a pressure at the tips; measure a deflection value of the fixed tip from a reference point corresponding to zero pressure at the tips; converting the deflection value to a calibrated pressure value using a pressure estimator; comparing the calibrated pressure value to a benchmark pressure value; and generating an error indication if a difference between the compared values exceeds a predetermined amount.

The method includes generating the pressure estimator by plotting two points of calibrated pressure values and corresponding measured deflection values of the tips, drawing a line between the points, and converting the line to an equation for determining a new calibrated force value from a new measured deflection value.

BRIEF DESCRIPTION OF THE SEVERAL VIEWS OF THE DRAWINGS

The above as well as other advantages of the invention will become readily apparent to those skilled in the art from the following detailed description of a preferred embodiment when considered in the light of the accompanying drawings in which:

FIG. 3 is a table of the alerts generated according to the method illustrated in FIG. 2;

FIG. 4 is a graphical representation of the parameter values that cause generation of the alerts described in FIG. 3;

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
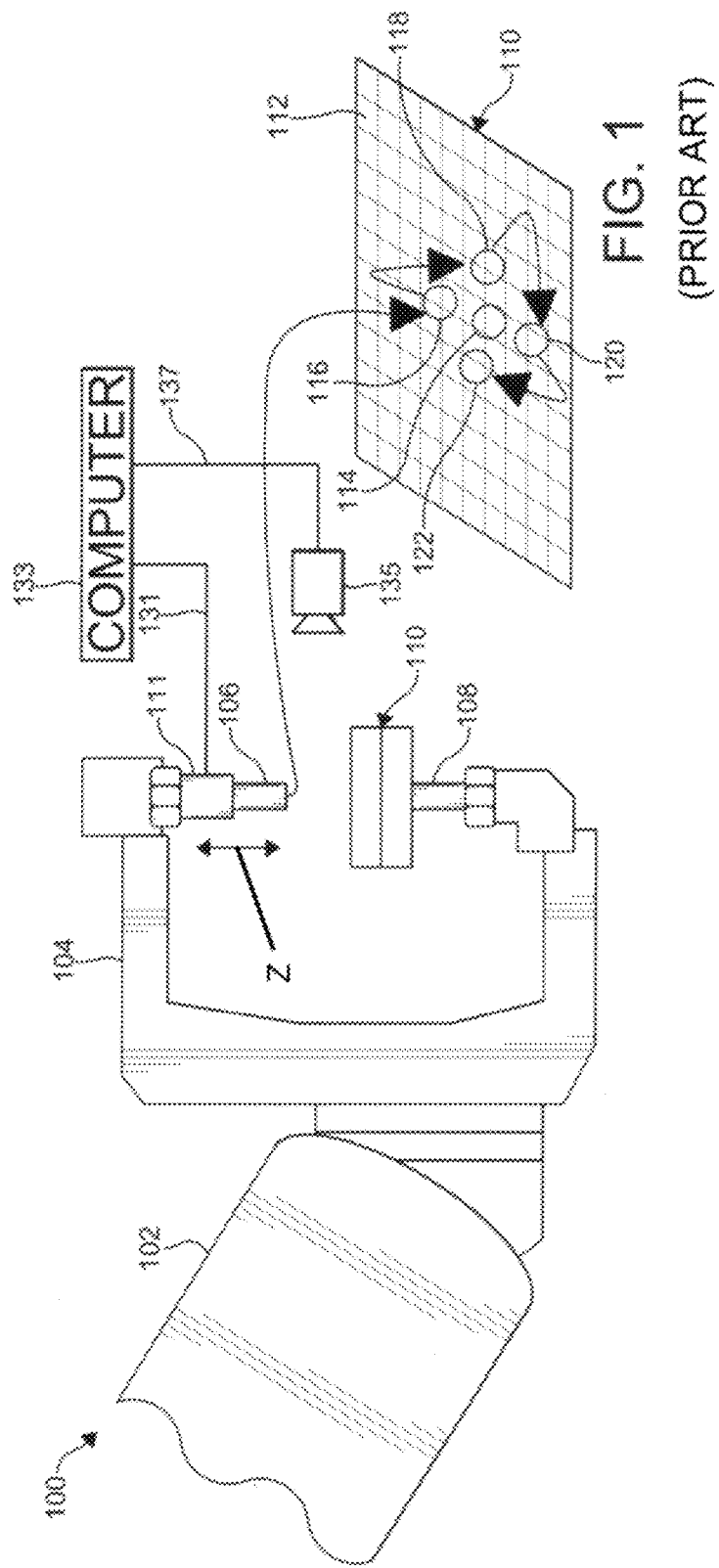
FIG. 1 is a schematic representation of a prior art robotic weld gun.

FIG. 1 shows a prior art robotic welding system 100 for use with a method of gun tip orientation normalization as described in the U.S. Pat. No. 9,144,860 B2. The robotic welding system 100 includes a welding robot 102 having a servo gun 104 with a movable tip 106 and a fixed tip 108.

The welding robot 102 is configured to weld a part 110, such as a metal panel for an automobile. Other types of parts 110 can also be welded with the robotic welding system 100.

The movable tip 106 can be coupled to at least one motor 111 configured to actuate the movable tip 106 in a direction toward the part 110, for example. The at least one motor 111 can be a servomotor, for example, configured to provided automatic feedback for fine position control. One of ordinary skill in the art can also employ other means of actuating the movable tip 106, as desired.

As further shown in FIG. 1, the method includes the steps of contacting a surface 112 of the part 110 with the movable tip 106 to measure a base test point 114, and subsequently contacting the surface 112 with the movable tip 106 to measure an at least two additional test points 116, 118, 120, 122 displaced from the base test point 114. Two non-collinear measurement vectors are calculated from the at least two additional test points 116, 118, 120, 122. A normal vector is calculated from these two vectors, and an angle between the normal vector and vector of original servo gun orientation 104 is determined.

The method can further include the step of adjusting the orientation of the servo gun 104 relative to the normal vector. The adjustment can be performed conditionally, based on the angle between the original orientation (vector) and the normal vector. For example, orientation correction can be skipped if the angle between the normal vector and the original orientation of the servo gun is too large. Other types of adjustments to the orientation of the servo gun 104 also can be used.

In a particular embodiment, the step of detecting the base test point 114 and the at least two additional test points 116, 118, 120, 122 during the steps of contacting the part 110 can include an electrical continuity measurement. For example, where the part 110 is grounded, the movable tip 106 is determined to have contacted the surface 112 when a tip voltage drops below a predetermined level due to contact of the movable tip 106 with the surface 112 of the grounded part 110. As shown in FIG. 1, the electrical continuity measurement can be communicated via a signal line 131 to a computer 133 such as a servo gun controller or a robot controller, as nonlimiting examples. The predetermined voltage and means for measuring the voltage of the movable tip 106 can be selected by a skilled artisan, as desired.

In another embodiment, the step of detecting the base test point 114 and the at least two additional test points 116, 118, 120, 122 during the steps of contacting the part 110 can include a non-contact optical sensor 135 in communication with the computer 133 by a signal line 137, as shown in FIG. 1. The non-contact optical sensor 135 can measure the distance in the Z direction between the movable tip 106 and the surface 112 of the part 110. For example, the non-contact optical sensor 135 can be at least one of an electric eye and a laser beam detector. One of ordinary skill in the art can select other types of non-contact optical sensors 135 for measuring the contact of the movable tip 106 with the surface 112 of the part 110, as desired.

The step of detecting the base test point 114 and the at least two additional test points 116, 118, 120, 122 during the steps of contacting the part 110 can be conducted by measuring a disturbance torque feedback of the movable tip 106 at the motor 111. The disturbance torque feedback can also be communicated to the computer 133 by signal line 131, or by other means, as desired. The disturbance torque feedback also can be used during the tip close motion to detect changes in gun friction in the close direction. This can prevent switching to pressure control too soon (low pressure) and detect that the servo gun is in need of lubrication or showing signs of wear.

As noted above, it is desirable to provide a method and an apparatus for detecting servo gun tip pressure changes. Such changes can provide pressure calibration error detection, spring change detection and a check of gun efficiency (Fc/Fb·100 where Fc is the current pressure and Fb is the benchmark pressure).

Figure 2:
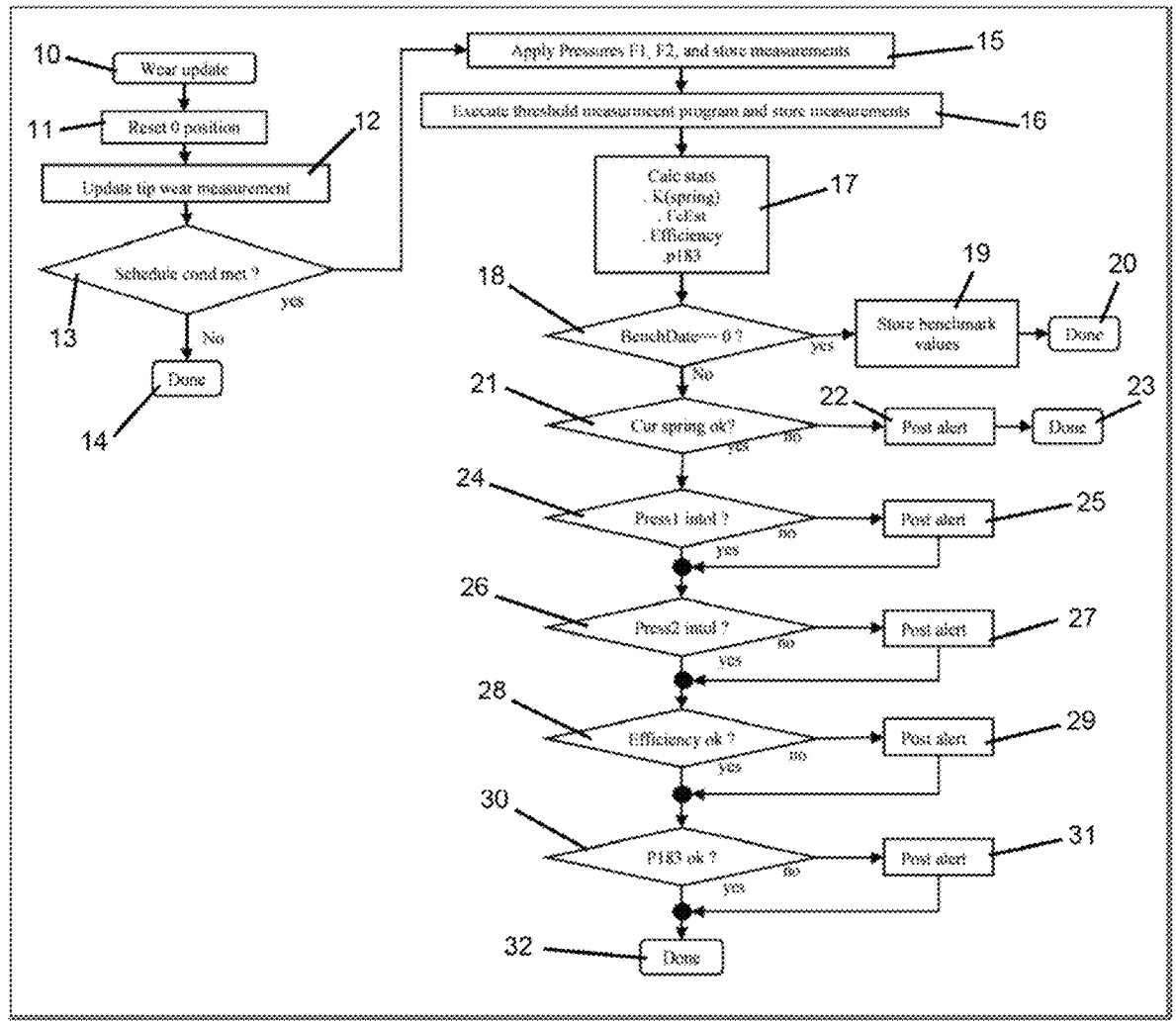
FIG. 2 is a flowchart of the servo gun pressure check method according to the invention.

FIG. 2 is a flow diagram of the servo gun pressure check method according to the invention. New pressure measurements are performed after a tip wear update that starts at a step 10. The gun tip is reset to the "0" position in a step 11. In the "0" position, the servo gun is closed with the tips touching at zero applied pressure. The tip wear measurement is updated in a step 12. The wear schedule conditions are checked in a step 13 "Schedule cond met?". If the conditions have not been met, the method branches at "no" to a "Done" step 14 at which the tip wear update process is done.

If the wear schedule conditions have been met, the method branches at "yes" from the step 13 to a step 15 to begin the new pressure test or measurement process. The method causes the servo gun 104 to apply pressures F1 and F2 at the gun tips and stores measurements, for example, in the computer 133. The measurements are the F1 and F2 pressure values and the corresponding gun deflection values. The method then enters a step 16 to execute a threshold measurement program and store the measurements obtained. In a step 17 the method calculates values for the parameters of a spring constant (K), a pressure force estimator (FcEst), Efficiency and inertia/friction during noload operation (P183). In a step 18, it is determined whether it is a first pressure test "BenchDate=0?" to establish a benchmark. If the answer is "yes", the parameter values are stored in a step 19 as benchmark values and the method exits at a "Done" step 20.

At each subsequent pressure test, the method will branch at "no" from the step 18 to a step 21 to check the current spring constant "Cur spring ok?" against the benchmark spring constant. If the spring constant values are different, the method branches at "no", generates an error indication in a step 22 "Post alert" and exits at a "Done" step 23. Such an error can indicate that the spring constant has changed and/or the relationship of the pressure to deflection has changed. Thus, the gun arm could be fracturing or the motor torque output has changed.

If the spring constant value has not changed, the method branches from the step 21 at "yes" to a step 24 to check whether the current first pressure has changed "Press1 intol?". If the pressure values are different, the method branches at "no", generates an error indication in a step 25 "Post alert" and enters a step 26. For example, this error can be generated when the pressure value has changed but deflection is the same or when the pressure value is the same, but the deflection has changed. If the first pressure value has not changed, the method branches from the step 24 at "yes" to the step 26.

In the step 26, the method checks whether the current second pressure has changed "Press2 intol?". If the pressure values are different, the method branches at "no", generates an error indication in a step 27 "Post alert" and enters a step 28. For example, this error can be generated when the pressure value has changed but deflection is the same or when the pressure value is the same, but the deflection has changed. If the second pressure value has not changed, the method branches from the step 26 at "yes" to the step 28.

In the step 28, the efficiency is checked "Efficiency ok?" to determine whether the ratio of the benchmark pressure value to an expected pressure value. If the efficiency is less than or greater than a predetermined range, for example 65% to 135%, the method branches from the step 28 at "no", generates an error indication in a step 29 "Post alert" and enters a step 30. If the ratio acceptable, the method branches from the step 28 at "yes" to the step 30.

In the step 30, the noload pressure/resistance to motion is checked "P183 ok?". Inertia/friction during noload operation (P183) is the basis for transition from position to pressure control. A change in the P183 value can affect pressure achieved and can also indicate a mechanical problem with the gun (wiper, bushing, etc.). P183 is measured during the new pressure measurements process and does not change after that. The P183 value has a 30% margin so misdetection and/or pressure error may have occurred if the actual value of the minimum contact pressure exceeds this margin the method branches from the step 30 at "no", generates an error indication in a step 31 "Post alert" and enters a step 32. For example, this error can be generated when the close thresh has changed by more than 30% and gun closure misdetection is possible. If the value is acceptable, the method branches from the step 30 at "yes" to the step 32 to exit at "Done".

FIG. 3 is a table summarizing the alerts generated during the performance of the method shown in FIG. 2. The alert numbers "1-5" correspond to the steps 22, 25, 27, 29 and 31 respectively. The alerts are detected by comparing the current values to the benchmark values. The pressure test message has variables for pressure parameters, but not benchmark variables. Benchmark variables are stored in local memory of the welding robot controller (computer 133) and are not part of the error alert message. The controller has the benchmark variables to support controller-based alerts. Cloud analytics can report controller alert result or can decide whether an alert is present, independently. The latter is preferable for flexibility. In the alerts "2" and "3", $dF=(Fc-Fcbench/fcbench)\cdot 100$ and $dX=(X-Xbench/Xbench)\cdot 100$, where "bench" identifies the benchmark value.

FIG. 4 shows plots of parameter values versus sample numbers (tests) for the alert numbers "1-5" described above.

Figure 5:
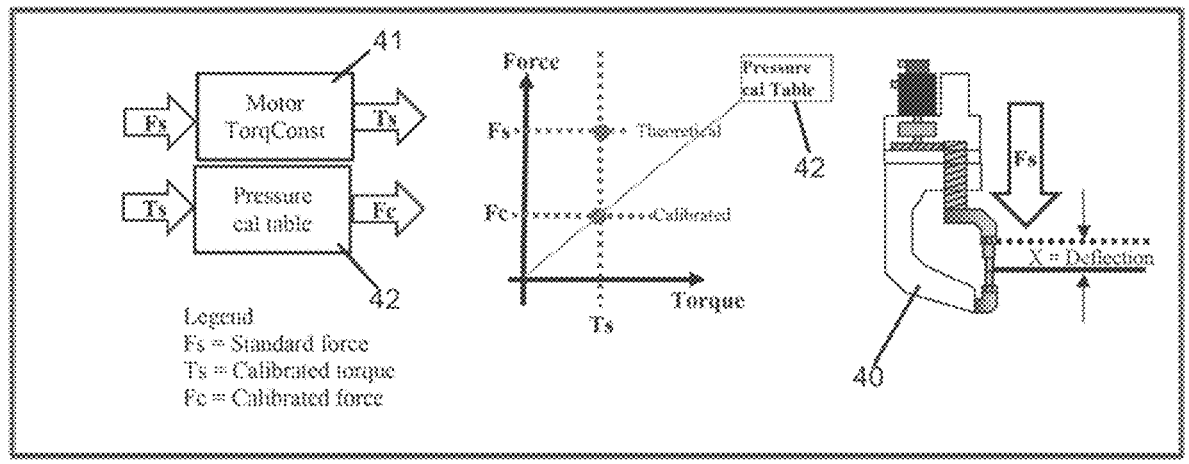
FIG. 5 is a schematic diagram of the pressure test formulation according to the invention.

FIG. 5 shows a schematic diagram of the pressure test formulation according to the invention. The servo gun 40 is operated to apply a standard force $F_s$ that results in a gun deflection value X. A torque command is calculated based upon the standard force value and a motor torque constant 41 to generate a calibrated torque value Ts (theoretical) that would apply the standard force $F_s$ at the servo gun tips. A calibrated force value Fc is calculated based upon the calibrated torque value Ts by using a pressure calibration table 42. The gun deflection X as a result of the applied torque is measured. The pressure (F) is used as a data parameter because it is more intuitive/meaningful to the user. The pressure at two points—Fmax and Fmax/2 provides sufficient feedback for overall range. Checking at Fmax provides the best estimate of the spring constant. The servo gun 104 (FIG. 1) is closed at zero applied pressure when the tips 106 and 108 are in contact to set the "zero" position. Then the pressure Fmax/2 is applied by moving the tip 106 and the resulting deflection X1 is measured using the sensor 135 (FIG. 1). Next the pressure Fmax is applied by further moving the tip 106 and the resulting deflection X2 is measured using the sensor 135. Since the sensor 135 is already present for tip orientation and wear checking, no additional sensor is required for the pressure test. The two sets of pressure and deflection values are used to create the pressure estimator shown in FIG. 6.

The spring change detection (step 21) is based on the standard force $F_s$. The standard force is independent of calibration, so input excitation (force) is constant. This means that the result is a function of X (deflection) only. The benchmark value is stored at the first pressure test. At the second and subsequent pressure tests, the current value is compared to benchmark value to calculate the difference percentage as:

$$K\text{dif }\% = (Ks[n]/Ksb - 1)\cdot 100.$$

Figure 6:
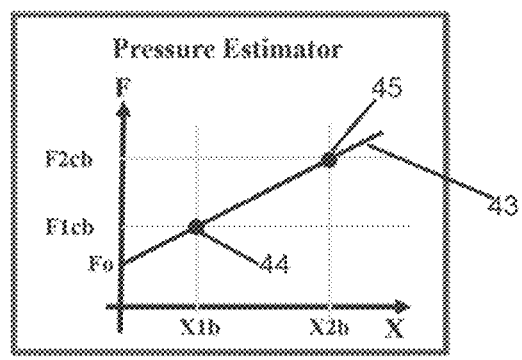
FIG. 6 is a plot of force versus deflection for estimating pressure according to the invention.

FIG. 6 is a plot of force versus deflection for estimating pressure. The pressure estimator is based on the spring constant and the calibrated pressure (benchmarks). As noted above, these parameters are recorded at the first pressure measurement (step 19). The benchmark calibrated pressure points (F1cb and F2cb) 44, 45 are plotted and a line is drawn through the points. The equation $m=(F2cb-F1cb)/(X2b-X1b)$ is calculated and the constant "m" is used in the equation $Fo=F2cb-X2b\cdot m$. Next, the calculations $Fc2est=Fo+X2\cdot m$ and $Fc1est=Fo+X1\cdot m$ are performed. During the second and subsequent pressure tests, the first pressure difference can be calculated as $F1c\text{dif }\% = (Fc1est/Fc1-1)\cdot 100$ for the step 24 and the second pressure difference can be calculated as $F2c\text{dif }\% = (Fc2est/Fc1-1)\cdot 100$ for the step 26.

The efficiency check (step 28) is a calculation of the ratio of the calibrated pressure value to the expected pressure value. Some energy is lost when converting torque to pressure, so the efficiency is always less than 100%. However, if the efficiency is less than 65% then there may be a problem with the configuration data or the motor. $\text{Efficiency} = F2c/F2s\cdot 100$.

In accordance with the provisions of the patent statutes, the invention has been described in what is considered to represent its preferred embodiment. However, it should be noted that the invention can be practiced otherwise than as specifically illustrated and described without departing from its spirit or scope.

The invention claimed is:

1. A method for detecting pressure changes at servo gun tips of a robotic welding system having a servo gun with a movable tip and an opposed fixed tip configured to weld a part comprising the steps of:
   storing benchmark values for a spring constant, a pressure estimator, an efficiency and an inertia/friction during noload operation;
   operating the servo gun to apply a first calibrated force at the gun tips and measuring a resulting first deflection value at the gun tips using a non-contact optical sensor;
   operating the servo gun to apply a second calibrated force at the gun tips and measuring a resulting second deflection value at the gun tips using the optical sensor;
   using the measured first and second deflection values and the pressure estimator to calculate current values for the spring constant, a first gun tip pressure, a second gun tip pressure, the efficiency and the inertia/friction during noload operation;
   comparing each of the current values with a corresponding one of the benchmark values; and
   generating an error indication for any of the current values that differs from the corresponding benchmark value by a predetermined amount.

2. The method according to claim 1 including selecting a standard force value; calculating a motor torque command based upon the standard force value and a motor torque constant for a motor to actuate the servo gun with a corresponding calibrated torque value; determining a calculated force value from the calibrated torque value and a pressure calibration table.

3. The method according to claim 2 including forming the pressure estimator by plotting two points of calibrated pressure values and corresponding measured deflection values of the gun tips, drawing a line between the points, and converting the line to an equation for determining a new calibrated force value from a new measured deflection value.

4. The method according to claim 1 including if the spring constant current value is different from the spring constant benchmark value generating an error indication.

5. The method according to claim 1 including if the first pressure current value is different from the first pressure benchmark value generating an error indication.

6. The method according to claim 5 including only generating the error indication if the difference is greater than ten percent.

7. The method according to claim 1 including if the second pressure current value is different from the second pressure benchmark value generating an error indication.

8. The method according to claim 7 including only generating the error indication if the difference is greater than ten percent.

9. The method according to claim 1 including if the efficiency current value is different from the efficiency benchmark value generating an error indication.

10. The method according to claim 9 including only generating the error indication if the difference is less than or greater than a predetermined range of a ratio of the efficiency current value to the efficiency benchmark value.

11. The method according to claim 10 wherein the range is 65% to 135%.

12. The method according to claim 1 including only generating the error indication if the Inertia/friction current value is different from the inertia/friction benchmark value.

13. The method according to claim 12 including only generating the error indication if the difference is greater than thirty percent.

14. The method according to claim 1 including performing tip wear measurements on the gun tips and only performing the steps if the tip wear measurements meet predetermined wear schedule conditions.

15. The method according to claim 1 including generating the error indication from a computer controlling the servo gun in response to any of the current values differing from a corresponding one of the benchmark values.

16. An apparatus for detecting pressure changes in a robotic welding system comprising:
a servo gun with a movable tip opposed by a fixed tip;
a motor coupled to the movable tip for moving the movable tip toward and away from the fixed tip;
a non-contact optical sensor configured to detect tip deflection values;
a computer connected to the motor for actuating the motor to move the movable tip; and
a pressure test computer program executed by the computer causing
the motor to move the movable tip to apply a first pressure at the fixed tip,
the motor then move the movable tip to apply a second pressure at the fixed tip,
the computer to store the tip deflection values measured by the optical sensor for the first and second pressures,
the computer to calculate and store values for a spring constant, a pressure force estimator, efficiency and inertia/friction during noload operation from the stored deflection values, and
if the pressure test is a first pressure test, designate the stored values as benchmark values.

17. The apparatus according to claim 16 wherein if the pressure test is not the first pressure test, designate the stored values as current values.

18. The apparatus according to claim 17 wherein the computer executes the pressure test computer program to generate an error indication in response to any of the current values differing from a corresponding one of the benchmark values.

19. A method for detecting pressure changes at servo gun tips of a robotic welding system having a servo gun with a movable tip and an opposed fixed tip configured to weld a part comprising the steps of:
closing the movable tip against the fixed tip to apply a pressure at the tips;
measuring, using a non-contact optical sensor, a deflection value of the fixed tip from a reference point corresponding to zero pressure at the tips;
converting the deflection value to a calibrated pressure value using a pressure estimator;
comparing the calibrated pressure value to a benchmark pressure value; and
generating an error indication if a difference between the compared values exceeds a predetermined amount.

20. The method according to claim 19 including generating the pressure estimator by plotting two points of calibrated pressure values and corresponding measured deflection values of the tips, drawing a line between the points, and converting the line to an equation for determining a new calibrated force value from a new measured deflection value.

* * * * *